United States Patent [19]

Humenik

[11] 4,251,820
[45] Feb. 17, 1981

[54] SOLDER GLASS BONDED CHARGE ELECTRODE ASSEMBLY FOR INK JET PRINTERS

[75] Inventor: James N. Humenik, LaGrangeville, N.Y.

[73] Assignee: International Business Machines Corporation, Armonk, N.Y.

[21] Appl. No.: 108,109

[22] Filed: Dec. 28, 1979

[51] Int. Cl.³ .......................................... G01D 15/18
[52] U.S. Cl. ................................. 346/75; 346/140 R
[58] Field of Search .............................. 346/75, 140 R

[56] References Cited

U.S. PATENT DOCUMENTS

| | | |
|---|---|---|
| 3,975,741 | 8/1976 | Solyst ........................................ 346/75 |
| 4,096,626 | 6/1978 | Olsen et al. ........................ 346/75 X |
| 4,101,906 | 7/1978 | Dahlstrom et al. ................... 346/75 |

Primary Examiner—George H. Miller, Jr.
Attorney, Agent, or Firm—Henry Powers

[57] ABSTRACT

A charge electrode structure assembly wherein an electrode pattern is coated on a dielectric substrate over which it is coated by a sealing layer of an insulating solder glass adapted to fusion bond to a second superimposed dielectric substrate. The solder glass is formed from a composition comprised of by weight, 56% $SiO_2$, 8% $Al_2O_3$, 8% $B_2O_3$, 6% BaO, 6% PbO, 6% $Na_2O$, 4% $ZrO_2$, 3% $Li_2O$ and 3% $La_2O_3$.

17 Claims, 11 Drawing Figures

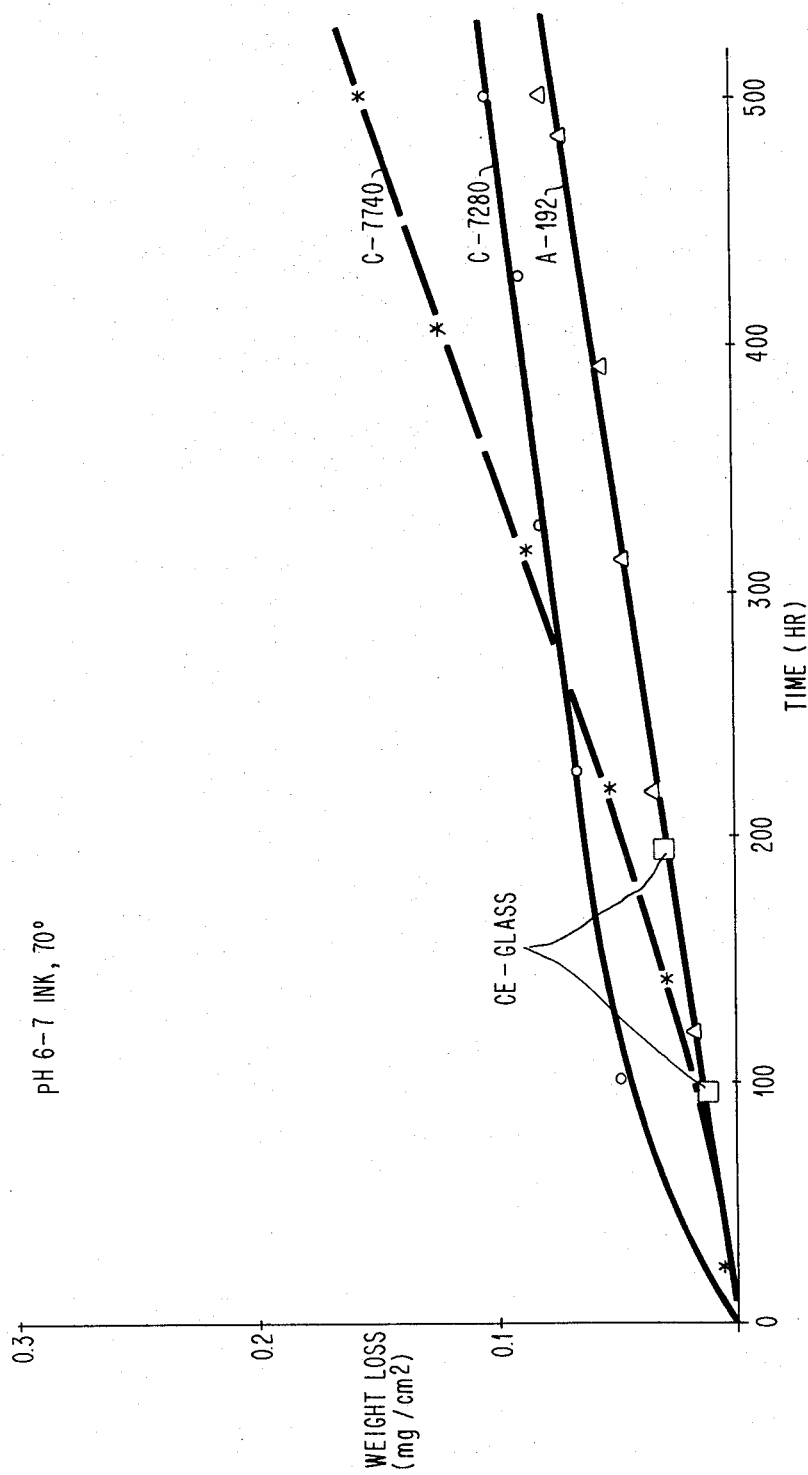

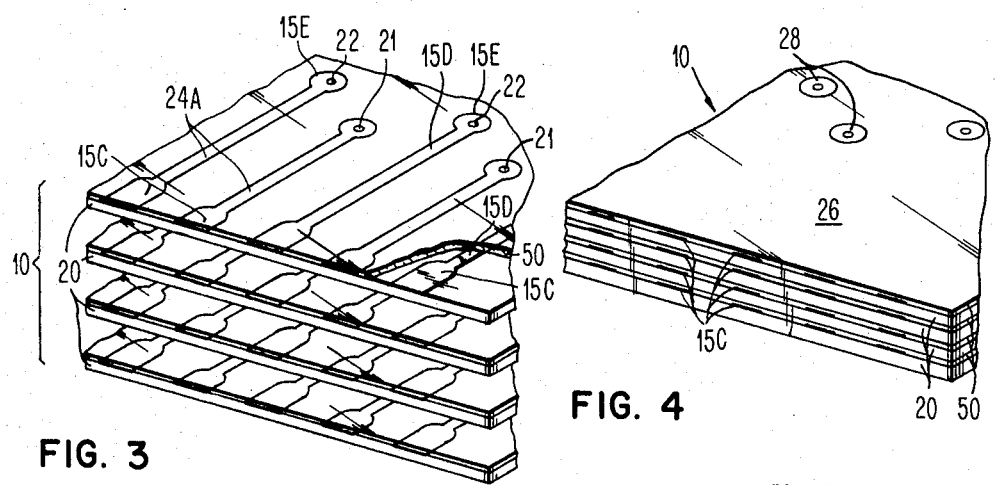
FIG. 3
FIG. 4
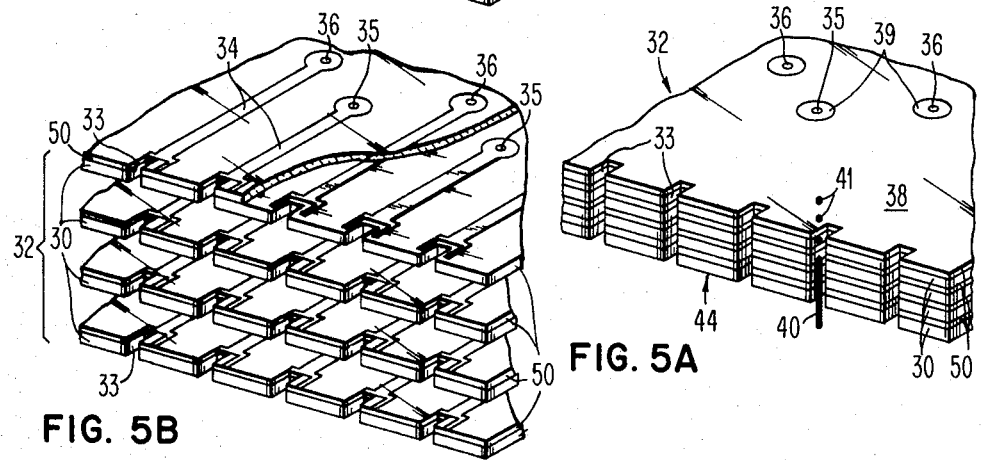
FIG. 5B
FIG. 5A
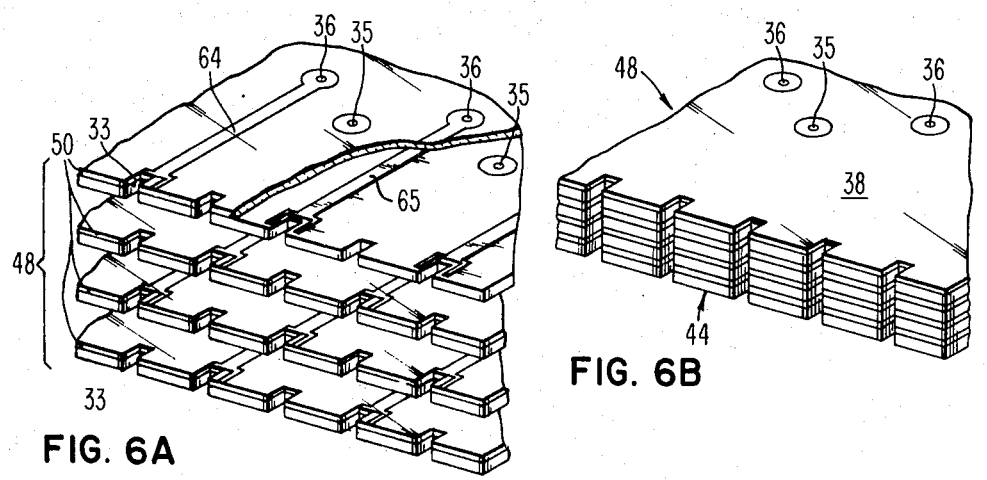
FIG. 6A
FIG. 6B

SOLDER GLASS BONDED CHARGE ELECTRODE ASSEMBLY FOR INK JET PRINTERS

DESCRIPTION

Technical Field

This invention relates to charge electrode structures for ink-jet printers, and more particularly to a solder or sealing glass for unification of a charge electrode assembly.

One object of the present invention is to provide an improved charge electrode structure for ink-jet printer.

Another object of this invention is to provide an electrode structure that prevents arcing between electrodes.

Another object of the present invention is to fabricate a charge electrode structure for ink-jet printers with improved resistance to acidic inks.

Another object of the present invention is to provide an ink-jet printer charge electrode structure that does not limit the choice of metallization for the electrodes in an acidic environment.

Another object of the present invention is to provide a fluid jet charge electrode with increased resistance to shorting and arching.

Background Art

In ink-jet printing, characters are built up by the selective impingement of small ink droplets on a writing surface. The actual operation involves a high pressure stream of droplets, each of which are selectively charged by a charge electrode and then electrostatically deflected to build up printed characters. Since some of the inks employed are corrosive in nature (e.g., acidic), the various parts of an ink-jet printing system that are exposed to contact with the ink must either inherently resist its attack or be protected by a resistive material. Charge electrodes, because of their close proximity to the ink stream, are constantly subjected to an ink mist and, therefore, must be resistant to it.

Typical charge electrodes for ink jet printing, as well as their use environment, are disclosed and described in U.S. Pat. No. 3,975,741, issued Aug. 17, 1976 for "Charge Electrode For Ink Jet" and U.S. Pat. 4,101,906 issued July 18, 1978 for "Charge Electrode Assembly For Ink Jet Printer". It has been suggested that glass can be used to seal the lower, electrode metallized substrate, with a cover plate. However, the glass used in such a seal must meet certain criteria: (1) because the glass comes in contact with a corrosive ink mist, it must be durable with respect to the ink; (2) also, because the glass is used to bond and seal dielectric plates (e.g., alumina), its thermal expansion, $\propto$, must therefore, be compatible with that of the plate; (3) to prevent arcing between closely spaced electrodes of a dense array, the glass must be capable of flow so as to completely encase the electrode without leaving bubbles that could form an arching path, and which must be accomplished without disturbing the glass frit used to bond the metallurgy formed from metallic pastes; and (4) to ease fabrication the glass must be able to flow and reflow without crystallization so that the bond will not be impeded by crystals.

BRIEF DESCRIPTION OF THE DRAWINGS

In the accompanying drawings forming a material part of this invention:

FIG. 2D is a graph illustrating the durability of a developed sealing glass employed in accordance with this invention relative to other known glasses.

FIGS. 3 to 6B illustrate various stages in the fabrication of ink jet electrode in accordance with other embodiments of this invention.

DISCLOSURE OF THE INVENTION

Figure 1:
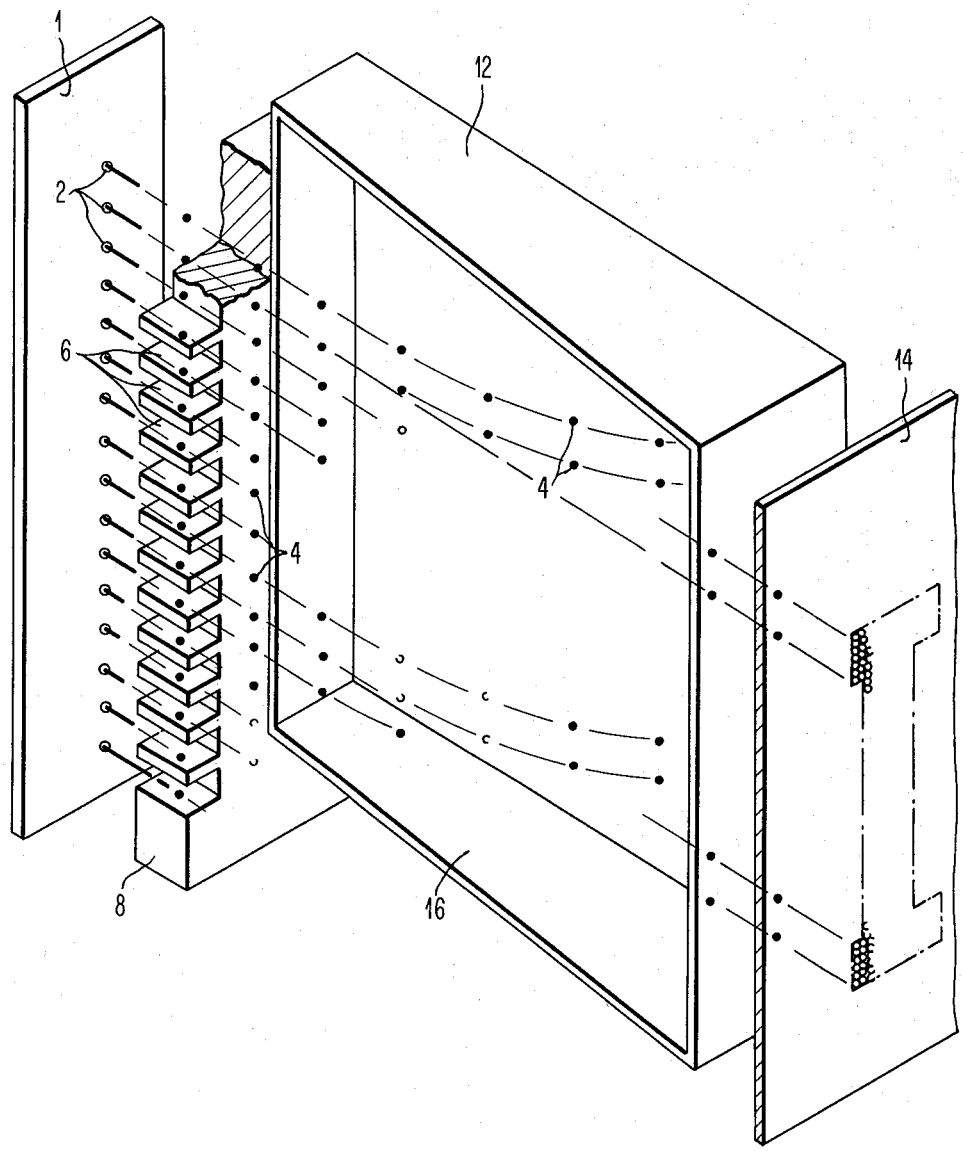
FIG. 1 is a schematic representation, in perspective, of an ink jet printing apparatus illustrative of the environment of this invention.

For further comprehension of the invention, and the objects and advantages thereof, reference will be had to the following description and accompanying drawings, and to the appended claims in which the various features of the invention are more particularly set forth.

A sealing or solder glass, developed in accordance with invention, for bonding and sealing components of charge electrode assembly, has the following composition, by weight, and thermal properties:

| | | | |
|---|---|---|---|
| $SiO_2$ | 56%, | $Na_2O$ | 6% |
| $Al_2O_3$ | 8%, | $ZrO_2$ | 4% |
| $B_2O_3$ | 8%, | $Li_2O$ | 3%, and |
| BaO | 6%, | $La_2O_3$ | 3% |
| PbO | 6% | | |

Strain point, $T_S = 484°$ C.
Anneal point $T_A = 520°$ C.
Softening point, $T_{SF} = 672°$ C.
Thermal Coefficient of
Expansion, $\alpha_{RT\text{-}300°\,C.} = 70.6 \times 10^{-7}/°C.$ This glass (identified herein as charge electrode, CE,-glass) has been applied to various rhodium metallized alumina substrates and flowed at 1050° C. to form an essentially bubble-free glaze completely encapsulating the metallurgy. This temperature is high enough to produce good flow of the CE-glass yet low enough so that the glass frit in the metal lines (from the metal paste) is not disturbed. Also, it has been found that, after the initial flowing of the CE-glass onto a metallized substrate, the CE-glass can later be reflowed to form an integrable bond between the metallized substrate and a cover plate. At no time is crystallization encountered which would inhibit the flow or reflow process.

In the preferred embodiment, the CE-glass is applied, to the metallized substrate in the form of 150–200 micron thick green sheet formulate with 6 wt.% polyvinyl butyral binder (based on combined weight with CE-glass particles, of about 5–25 microns) after evaporation of methyl isobutyl ketone and methonol as solvents originally added to enable sufficient free-flow for casting of the green sheet in accordance with conventional techniques. The CE-green sheet is then superimposed on the metallized substrate and heated to 800° C. to burn-out the binder followed by heating to 1050° C. to flow and coalesce the glass particles into a glass coating bonded to the substrate and encasing the metallurgy. A cover plate is then superimposed on the glass coating, and the assembly reheated to 1050° C. to bond the cover plate to the substrate and sandwich the metallurgy therebetween.

The CE-glass was compared to the other glasses, by testing in acidic ink (ph=6–7) at 70° C. for up to 192 hours. These glasses are identified as A-192 type glass formed from a composition of, by weight, 55–58% $SiO_2$, 17–22.5% $ZrO_2$, 16–17% $Na_2O$, 2–3% $K_2O$, 3–5% $MgO$, 0–1% $Al_2O_3$, and 0–2.5% $CaO$, (of the type disclosed in U.S. Pat. No. 4,122,460, issued Oct. 24, 1978), Corning C7280 glass (having the following % weight composition:

| C-7280 | | | |
|---|---|---|---|
| $SiO_2$ | 71 | $K_2O$ | 0.5 |
| $Al_2O_3$ | 1 | $Li_2O$ | 1 |
| $ZrO_2$ | 15 | | |
| $Na_2O$ | 11 | | | and Corning C-7740 Pyrex glass (having the following wt.% composition:

| C-7740 | |
|---|---|
| $SiO_2$ | 81 |
| $Al_2O_3$ | 2 |
| $B_2O_3$ | 13 |
| $Na_2O$ | 4 |

The results are shown in FIG. 2D from which it can be seen that the CE-glass of this invention is more resistant to the acidic ink than are the C-7280 and C-7740, two commercial glasses known for their excellent durability.

BEST MODES FOR CARRYING OUT THE INVENTION

With reference to FIG. 1, as shown schematically, an ink-jet printer comprises a nozzle plate 1 having a multiplicity of nozzle elements 2 through which a pressurized electrically conductive jet of ink is propelled. The ink jet is vibrated, as by piezoelectric means for example, so that each continuous jet of ink that is issued through each nozzle element is separated into a series of discrete droplets 4 which are uniform in dimension and spacing.

A plurality of charge electrodes 6 formed on a charge plate 8 are interposed in the paths of the streams of the conductive ink droplets. In operation, a potential is selectively applied from a controlled power supply 10A (FIG. 2B) to the charge electrode 6, so that the ink droplets in the electrical field formed by the charge electrodes will be capacitively charged or not charged, according to the potential that is applied to the electrodes at the time that a droplet passes through the area of the electrode.

The charged or uncharged droplets continue in the path into an electric field generated by a deflection plate 12, which can be connected between a reference potential, such as ground, and a relatively high positive potential (not shown). The electric field, established by the deflection plate 12, causes a deflection of those ink droplets that had a positive charge, so that these charged droplets will be deflected from the direction of travel and thus away from a target record medium 14. These deflected droplets are effectively removed from the stream of ink, and are collected in a gutter 16, which may be combined with deflection plate 12. In this way, the unused ink may be recovered and recycled for reuse.

The uncharged droplets, which have not been deflected, continue in their path and impinge upon the record medium or paper 14. Relative movement between the impacting droplets and the paper results in the registration of intelligent data which will form the desired record.

Figure 2A:
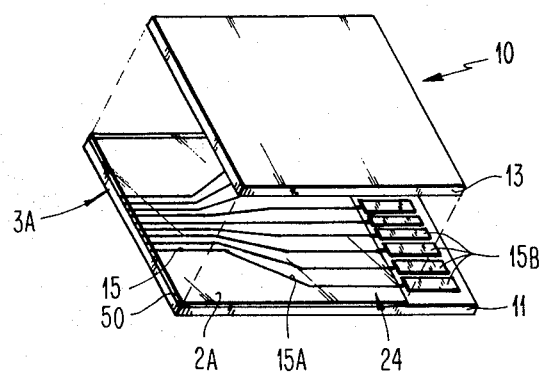
FIGS. 2A to 2C schematically various stages in the fabrication of a charged electrode structure in accordance with this invention.
Figure 2B:
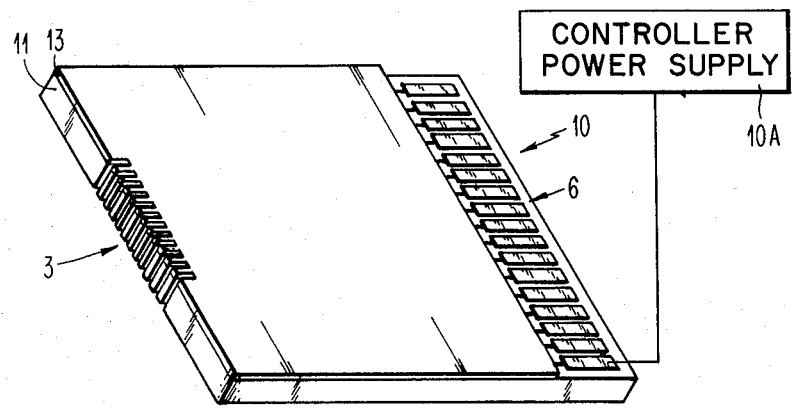
Figure 2C:
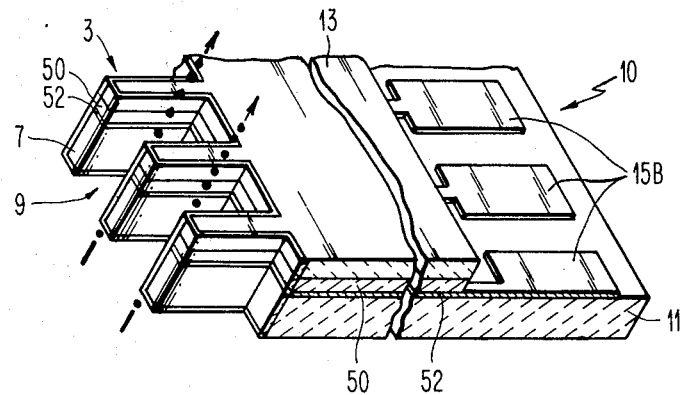

Referring to FIGS. 2A to 2C, a charge plate 10 is illustrated for use with ink-jet printers. The charge plate is shown with a crenelated or multi-notched edge 3 having tongue portions 7 and grooves or kerfs 9 defining U-shaped passage means through which the ink-jet passes.

The charge plate, in the form shown in FIGS. 2A–2C, is formed from a dielectric base sheet 11 and a foreshortened cover plate 13. In one preferred form, the basesheet 11 and cover plate 13 will comprise high alumina ceramic substrates containing from 96 to 99 wt.% of $Al_2O_3$ as a ceramic base. A planar electrode pattern 24 is formed on the top surface of base sheet 11 by any suitable process. In one form, the electrode metallization can be screened from a suitable metal paste comprised of metal particles (e.g. rhodium, platinum, etc.) and particles of a glass binder (such as Corning 7280 glass). Alternatively, the electrode pattern can be formed by sputtering or plating of suitable electrically conductive material over the entire face of dielectric base sheet 11, followed by application (not shown) of a layer of photosensitive masking material. Appropriate electrode patterns 24 may then be formed through photolithographic masking techniques and subsequent etching of the unmasked metallization to leave the electrode pattern 24, followed by removal of the resist mask. In the form shown, the electrode pattern with included charge portions 15, at the edge 3A, of base/sheet 11, with fanned-out lead portions 15A extending to electrode terminal portions 15B adapted for connection to external circuitry (e.g. 10).

For insulating purposes, the electrode pattern 24 is then coated by any suitable technique with a dielectric insulating layer 50 as comprehended by the CE-glass in accordance with this invention. In accordance with one technique, as described above, a CE-glass layer 50 can be applied in the form of a CE-green sheet which can be formulated into a paint composition containing by weight, 48% of CE-glass particles or frit in the 5 to 25 micron range, 6% of a B-98 binder, and 33 and 11% of methyl isobutyl ketone and methanol respectfully, as the binder solvents, in conjunction with minor amounts of plasticizers, conditioners, etc. The paint composition can then be cast into a 100 to 200 micron thick, slurry on a supporting surface followed by evaporation of the solvent to form the green sheet. This green sheet is then superimposed on base sheet 11 over the electrode patterns as the insulating layer 2A. If desired, and preferably, the assembly is fired to 1050° C. to burn-out the green sheet binder, and to flow or coelesce the CE-glass particles into the CE-glass layer 50 in bonded relationship to base sheet 11. This initial firing is preferred so as to not inhibit the removal of the decomposition products of the binder.

The electrode assembly is then completed by superimpositioning of the foreshortened cover plate 13 on glass layer 50 so as to expose the electrode terminals 15B, followed by heating the final assembly to 1050° C. to reflow the CE-glass layer in bonding relationship to cover plate 13. The leading edge 3A is then crenelated into the multi-notched edge 3 by any suitable technique, as by use of a ganged saw assembly, not shown.

For protection of the exposed portions of the electrodes in the grooves 9, of the crenelation, a 1000 Å thick conductive layer 52 of a noble metal, such as rhodium or platinum, may be deposited on the side and end walls of grooves 9 by any suitable technique such as sputtering or evaporation.

The electrode terminal 15B may then be interconnected by suitable plugs and/or wiring to charge electrode driver circuits by known technique discussed in the said U.S. Pat. No. 3,975,741 and No. 4,101,906.

FIGS. 3 to 6B show the fabrication of a multi-layered electrode structure. In FIG. 3, a series of dielectric sheets 20 are formed with a series of punched or cut holes 21 and 22. Planar electrode patterns 24A are then deposited on corresponding surface of the dielectric sheets 20 by any suitable deposition process, as discussed above. The electrode patterns are formed with an electrode charge portion 15C, a lead portion 15D and a terminal portion 15E. A CE-green sheet, of this invention is then superimposed on the dielectric component sheet 20 over the electrode pattern, and fired to burn-out binder and to flow the CE-glass particle into a CE-glass layer 50 bonded to the sheets. Not shown in FIGS. 3 or 4.

A plurality of the glass coated dielectric sheets are stacked on each other (e.g. patterned face against unpatterned face or glass coated against uncoated face) so that the charge electrode positions 15C and holes or apertures 21 and 22 are aligned with each other. The stack can then be topped with a sheet 26 which may be identical to sheets 20 having aperture 21 and 22 but having no electrode pattern and metal leads 24A. The stack can then be fired to reflow the CE-glass in bonded relationship to the superimposed sheets. Apertures 21 and 22 can then be suitable filled with an interconnecting fill 28, which can also be formed concurrently with the formation of the electrode pattern if formed by use of metal paste which preferably are formed on green dielectric sheets prior to their firing. As previously, the leading edge 3B of the integrated electrode assembly can be crenelated by ganged saw technique into a structure resembling FIG. 5A, followed by deposition of a protective coating of rhodium on the side and end walls of the resultant U-shaped notches.

FIGS. 5 to 6B show the fabrication of embodiments where the electrode patterns are not exposed at the jet passage means, but in contrast are spaced from the openings. Here the dielectric sheets 30, forming the charge plate assembly 32 may comprise pre-cut open-sided notches 33 along and extending inwardly from one edge of each of the sheets 30. The charge electrode pattern 34 are formed in the shape of bifurcations or forks surrounding and spaced from the notches 33. As in the other embodiments a CE-green sheet is superimposed on the component sheet 30, and fired to burnout the binder and flow the CE-glass into a bonded layer 50 to each sheet 30 over the electrode patterns 34. The sheets are then stacked together with a top sheet 38 having the appropriate notches 33 and holes 35 and 36 formed therein, but without the electrode pattern. The class coated sheets 30 and 38 are thus stacked in alignment with one another and fired to reflow the CE-glass layer into bonding relationship with overlying component sheets. The holes 35 and 36 are electrically interconnected to form terminals for connection to charge voltage sources. It is noted that since the electrode edge charge portions 15C are spaced from grooves 33, they are encapsulated within the CE-glass layer eliminating need for protective coatings on the groove walls.

As illustrated in FIGS. 5A and 5B, notches 33 form a single row of openings or passage means. For the purpose of illustration, one of the ink-jet streams emanating from one of the one orifices, comprising filament 40 and 41 is shown flowing through the notched charge electrodes defined by notches 33 in the charge plate assembly 32. For a two-row ink jet head, either two charge electrode plates 32 can be used, or the charge patterns 34 may be alternately staggered at varying depths from edge 44 of charge plate 32 as shown in FIGS. 6A and 6B. In any event, through-hole plating of apertures 35 and 36 of electrically conductive material can be employed to form a terminal 39 for interconnecting the charge patterns 34 and provide access to outside circuitry.

In dense arrangements where the ink jet streams are closely spaced, electrical separation may be attained by staggering the electrode patterns 64 and 65 as illustrated in FIG. 6A. The notching, assembly, alignment and lamination of the charge plate components is identical with that described with respect to FIGS. 5A and 5B to form the resultant laminated structure of FIG. 6B.

Although the fabrication has herein been described with respect to charge plate assemblies for ink jet printers, it is to be understood that the invention may be employed in other applications. Among these applications is the use of the CE-glass as a glaze for alumina substrates to which thin films are applied. Here good flow is required to give a smooth pore-free glaze, and chemical durability is required because such substrates often undergo chemical treatment during anodization of capacitors. Also, because the CE-glass is thermally compatible with alumina it can be used as an acid resistant seal glass for alumina in a myriad of applications.

While the invention has been illustrated and described with respect to preferred embodiments, it is to be understood that the invention is not to be limited to the precise construction herein disclosed and the right is reserved to all changes and modifications coming within the scope of the invention as defined in the appended claims.

Having thus described the invention, what is claimed as new, and desired to be secured by Letters Patent is:

1. A charge electrode for ink-jet printers, comprising:
   (a) a pair of matching ceramic substrates each having a like multi-notched edge;
   (b) a conductive charge pattern on a first of said substrate and having individual runs with bifurcated portions extending adjacent the edge portions of the projection defining a corresponding notch of said edge,
   (c) a fused glass layer "formed from a composition comprising, by weight 56% $SiO_2$, 8% $Al_2O_3$, 8% $B_2O_3$, 6% $BaO$ 6% $PbO$, 6% $Na_2O_2$, 3% $Li_2O$, and 3% $La_2O_3$" overcoating and bonded to at least the bifurcations of said pattern and to said first substrate, with
   (d) the second said substrate superimposed on and bonded by said fused glass layer to said first substrate to sandwich said pattern therebetween.

2. The charge electrode of claim 1 wherein said substrates are alumina based ceramics.

3. A charge electrode structure for ink-jet printers comprising as a stacked laminate assembly:
   (a) a plurality of dielectric sheets, each having like passage means herein for passage of an ink jet stream;
   (b) a plurality of planar charge electrodes interposed between certain adjacent pairs of said dielectric sheets, and disposed about said passage means; and (c) a layer of the said fused sealing glass "formed from a composition comprising, by weight, 56% $SiO_2$, 8% $B_2O_3$, 6% $BaO$ 6% $PbO$, 6% $Na_2O$, 4% $ZrO_2$, 3% $Li_2O$, and 3% $La_2O_3$" between and bonding at least said certain sheets together and encasing said electrodes therein.

4. The charge electrode structure of claim 3 wherein said sheets are alumina based ceramic substrate.

5. The charge electrode structure of claim 3 wherein said passage means comprise an aperture through said sheets.

6. The charge electrode structure of claim 5 wherein said sheets are alumina based ceramic substrates.

7. The charge electrode structure of claim 3 wherein said electrodes are disposed in spaced and adjacent relationship to the edges of said passage means.

8. The charge electrode structure of claim 7 wherein said sheets are alumina based ceramic substrate.

9. The charge electrode structure of claim 7 wherein said passage means comprise an aperture through said sheets.

10. The charge electrode structure of claim 3 wherein said passage means comprise U-shaped notches extending inwardly from common edges of said sheet.

11. The charge electrode structure of claim 10 wherein said sheets are alumina based ceramic substrate.

12. The charge electrode structure of claim 10 wherein said electrodes are disposed in spaced and adjacent relationship to the edges of said passage means.

13. The charge electrode structure of claim 12 wherein said sheets are alumina based ceramic substrate.

14. The charge electrode structure of claim 10 wherein said electrodes include U-shaped fork portions extending about said U-shaped notches.

15. The charge electrode structure of claim 14 wherein said sheets are alumina based ceramic substrate.

16. The charge electrode structure of claim 14 wherein said electrodes are disposed in spaced and adjacent relationship to the edges of said passage means.

17. The charge electrode structure of claim 16 wherein said sheets are alumina based ceramic substrate.

* * * * *

UNITED STATES PATENT AND TRADEMARK OFFICE
CERTIFICATE OF CORRECTION

PATENT NO. : 4,251,820
DATED : February 17, 1981
INVENTOR(S) : James N. Humenik

It is certified that error appears in the above-identified patent and that said Letters Patent are hereby corrected as shown below:

Column 6, line 52, "6% $Na_2O_2$," should read --6% $Na_2O$,--,

Column 6, line 52, before "3% $Li_2O$," insert --4% $ZrO_2$,--,

Column 6, line 64, "herein" should read --therein--,

Column 7, line 3, before "8% $B_2O_3$," insert --8% $Al_2O_3$,--.

Signed and Sealed this

Third Day of July 1984

[SEAL]

Attest:

GERALD J. MOSSINGHOFF

Attesting Officer   Commissioner of Patents and Trademarks